US 6,711,765 B1

(12) United States Patent
Mitchell, III et al.

(10) Patent No.: US 6,711,765 B1
(45) Date of Patent: Mar. 30, 2004

(54) ADJUSTABLE BED FRAME

(76) Inventors: Herbert L. Mitchell, III, 1 Chowan Rd., Greensboro, NC (US) 27407; Walter L. Lazemby, Jr., 1145 Coolspring Rd., Statesville, NC (US) 28625

(*) Notice: Subject to any disclaimer, the term of this patent is extended or adjusted under 35 U.S.C. 154(b) by 1 day.

(21) Appl. No.: 10/287,402

(22) Filed: Nov. 4, 2002

(51) Int. Cl.[7] .............................................. A47C 19/04
(52) U.S. Cl. .................. 5/202; 5/201; 5/310; 403/403; 403/205; 403/396; 403/203
(58) Field of Search ........................ 5/202, 201, 200.1, 5/310, 285; 403/403, 205, 396, 203

(56) References Cited

U.S. PATENT DOCUMENTS

| | | | | |
|---|---|---|---|---|
| 2,466,494 A | * | 4/1949 | Slagle ............................ | 5/310 |
| 2,779,952 A | * | 2/1957 | Sten ............................... | 5/310 |
| 5,477,571 A | * | 12/1995 | Roggenkamp et al. ........ | 5/200.1 |
| 5,815,860 A | * | 10/1998 | Mitchell ......................... | 5/202 |
| 6,269,498 B1 | * | 8/2001 | Perkins .......................... | 5/202 |

* cited by examiner

Primary Examiner—Alexander Grosz
(74) Attorney, Agent, or Firm—Coats & Bennett, P.L.L.C.

(57) ABSTRACT

A bed frame section comprising a pair of telescoping members adapted to be connected or utilized within a bed frame structure. At least one adjustable leg connector is mounted on one of the members. The leg connector includes a generally inverted U-shaped strap that extends over the member and an extension that extends downwardly from the U-shaped strap and includes an opening for receiving an upper portion of a leg. The upper portion of a leg is inserted into the opening of the extension, and the leg and extension are secured together by a bolt and nut assembly. By tightening the bolt the inverted U-shaped strap is closed around the member. When the bolt assembly assumes a loosened state, the inverted U-shaped strap along with the attached leg can be moved along the length of the member.

20 Claims, 3 Drawing Sheets

ADJUSTABLE BED FRAME

FIELD OF THE INVENTION

The present invention relates to bed frames, and more particularly to an adjustable bed frame section.

BACKGROUND OF THE INVENTION

Bed frames are utilized for supporting either a mattress or a combination of box springs and mattress. Typically a bed frame includes a pair of side rails connected by head and foot sections. Further, such bed frame structures typically include a series of transverse slats that extend between the side rails and which supports a box spring or mattress.

Bed frames assume various widths. For example, a double bed has-a width of fifty-four (54) inches. A queen size bed has a width of sixty (60) inches. A California King has a width of seventy-six (76) inches while a conventional King size bed has a width of seventy-eight (78) inches. In the past, some bed manufacturers have been required to produce a separate bed frame for each size of box springs and mattress produced. This, of course, has required such manufacturers to stock a large quantity of different size bed frames.

Adjustable bed frames are known. See for example, the disclosures found in U.S. Pat. Nos. 6,269,498 and 5,815,860. Both of these patents show an adjustable frame that includes telescoping head and foot sections that permit the bed frames to accommodate various widths.

Bed frames also typically include a series of feet or legs that extend downwardly from the frame to engage the floor. These feet support the bed frame, the box springs and/or mattress, and any individual or individuals on the bed. It is, of course, desirable to provide a fairly uniform spacing of the feet for efficiently transferring the weight or load associated with the bed to the underlying floor. Often with adjustable bed frames, the feet or legs are fixed on the individual components that comprise the bed frame and cannot be adjusted. Thus, the spacing of the feet with respect to each other changes when the bed frame is expanded or contracted. Consequently, when the feet are fixed to the individual frame members, it follows that the feet cannot be uniformly and properly spaced for all width variations.

Therefore, there has been and continues to be a need for a simple, adjustable bed frame structure that includes adjustable feet or legs that enable the feet or legs to be adjusted with respect to the head and foot sections of an adjustable bed frame structure.

SUMMARY OF THE INVENTION

The present invention entails an adjustable bed frame section having first and second telescoping members. Further, the bed frame section includes at least one leg assembly secured to the bed frame and including a leg, and a saddle connector extending over one of the members and connected to a portion of the leg by a fastener.

Further, in one particular embodiment, the bed frame section includes an elongated member, a leg, and a leg connector adapted to be mounted on the elongated member and including an upper section the extends at least partially around the elongated member and includes an extension that extends downwardly from the upper section, wherein the extension includes an opening for receiving an upper portion of the leg. A fastener is utilized to secure the extension to the upper portion of the leg.

Finally, the present invention entails a method for adjusting the width of a bed frame section and the position of one or more supporting legs where the bed frame section includes a pair of telescoping members and a leg connector connecting one leg to one of the members. This method entails extending the telescoping members a selected length and moving the leg connector along the length of one of the members. Thereafter stationing the leg connector on one of the members at a particular position by extending a fastener through a portion of the leg and through an extension that extends from the leg connector. Next, the fastener is tightened to secure the leg connector around a portion of one of the members.

DESCRIPTION OF EXEMPLARY EMBODIMENT

Figure 1:
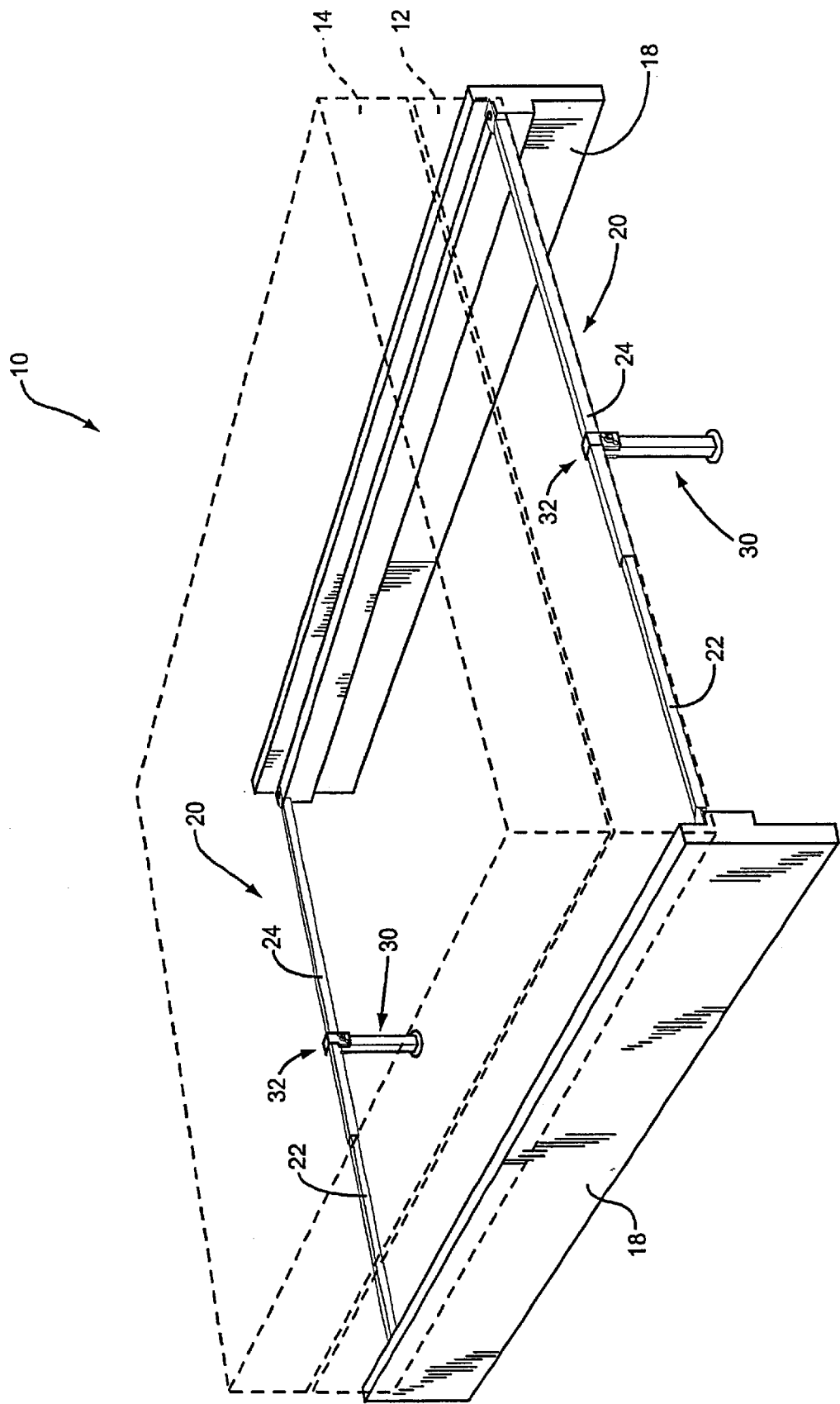
FIG. 1 is a perspective view of a bed frame structure including the adjustable bed frame section of the present invention.

With further reference to the drawings, a bed frame structure 10 is shown therein and is adapted to support a box springs 12 and a mattress 14. It will be understood and appreciate by those skilled in the art, that the bed frame structure could be utilized to support simply a mattress or a combination box springs and mattress. Viewing the bed structure 10, it is seen that in conventional fashion the same includes a pair of side rails 18 that extend from the head portion of the bed frame structure to the foot portion of the bed frame structure. Interconnected at the head and foot portions of the bed frame structure 10 is an adjustable bed frame section, indicated generally by the numeral 20. As will be appreciated from subsequent portions of this disclosure, each adjustable bed frame section 20 can be varied in length such that the bed frame structure 10 may assume a double, Queen, or King width. Although not shown, the bed frame structure 10 may be provided with a plurality of slats that would extend between the side rails 18.

Turning to a discussion of the adjustable frame section 20, it is seen from the drawings, that the same comprises a pair of members 22 and 24. Members 22 and 24 are telescopically connected. That is, member 22 is of a slighter smaller cross-section and is designed to fit within member 24. More particularly, member 22 is sized such that it can slide back and forth within member 24. While the shape of members 22 and 24 can vary, in this exemplary embodiment, the cross-sectional shape of each member 22, 24 is either square or rectangular.

As noted above, the opposite ends of each adjustable bed frame section 20 is adapted to be attached to a respective side rails 18. Accordingly, each adjustable bed frame section 20 includes an outer terminal end 26 that is provided with a bolt or screw opening (not shown) that permits the end to be secured to a portion of a side rails 18. While the outer terminal end 26 can assume various shapes and configurations, in the exemplary embodiment disclosed herein, the outer terminal end is formed by simply stamping or pressing the outer ends of the tubular stock so as to press the upper and lower sides together and effectively form a tongue-shaped extension that effectively forms the terminal end 26.

Figure 6:
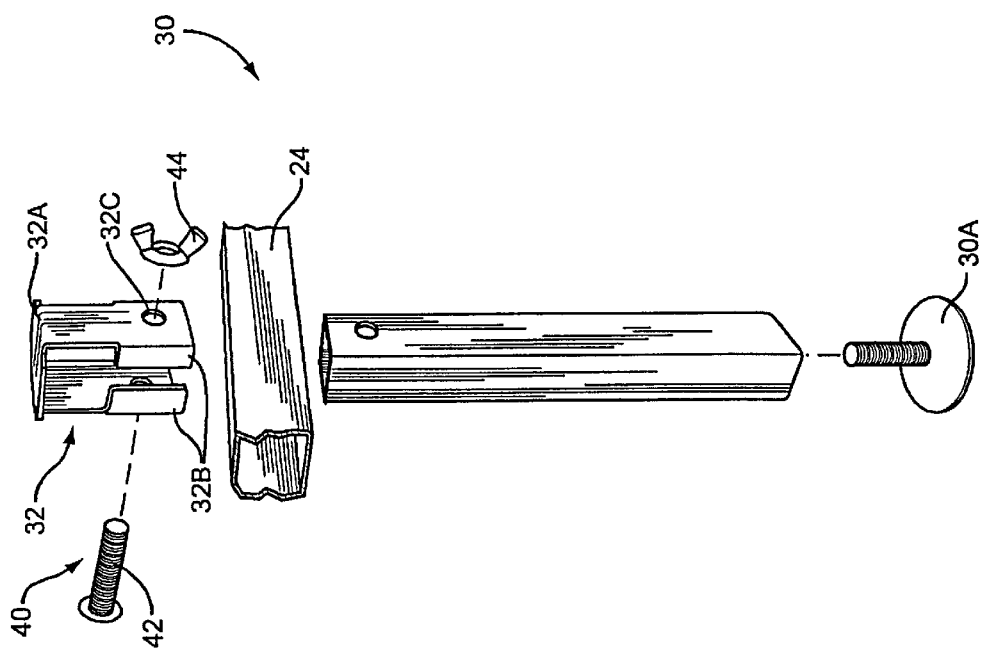
FIG. 6 is an exploded fragmentary perspective view similar to FIG. 5.

Each adjustable bed frame section 20 includes a leg indicated generally by the numeral 30 and a leg connector, indicated generally by the numeral 32 that connects the leg 30 to one of the members 22, 24. Viewing leg 30 in more detail, in this exemplary embodiment, the leg 30 assumes a square or rectangular cross-section. Leg 30 includes an upper portion that includes a transverse opening (FIG. 6) that extends through the leg. As will be appreciated from subsequent portions of this disclosure, this transverse opening enables a bolt or screw to extend therethrough. Secured to the lower portion or lower end of the leg 30 is a base or foot 30A. In this exemplary embodiment, the base 30A includes a circular disc having a threaded stud extending upwardly therefrom. The threaded stud is adapted to be screwed into a threaded bore contained within the lower portion of the leg 30. It is appreciated that the effective height of the leg 30 can be adjusted by selectively positioning the threaded stud within the threaded bore of the leg 30.

Now turning to the leg connector 32, the leg connector is adapted to be secured on the adjustable bed frame section 20 and is operative to be moved along the length of the members 22 and 24 and to be securely stationed at various points along their lengths. More particularly, the leg connector 32, sometimes referred to as a saddle connector, is adapted to be connected to the upper portion of the leg 30 and to secure the leg to one of the members 22 or 24.

Figure 5:
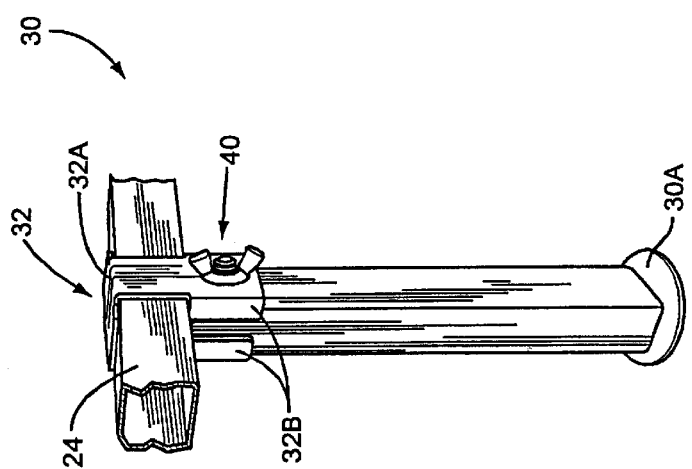
FIG. 5 is a fragmentary perspective view showing the leg connector of the adjustable frame section.

Viewing the leg connector 32 in more detail, it is seen that the same includes an inverted U-shaped strap 32A. This U-shaped strap 32 extends substantially around the underlying member 22 or 24. Note in FIGS. 5 and 6, where the U-shaped strap 32 engages the top and opposed sides of member 24.

Extending below the U-shaped strap 32A is an extension 32B. The function of the extension 32B is to connect to and receive the upper portion of the leg 30. In the case of the present embodiment, the extension 32B includes a pair of opposed C-shaped flanges, and extends substantially around the upper portion of the leg 30. Specifically, in the case of this exemplary embodiment, the C-shaped flange engages three sides of the leg. More particularly, the extension 32B defines an opening for receiving and holding the upper portion of the leg 30. The opening defined by the extension 32B is formed by the opposed C-shaped flanges that lie below the U-shaped strap 32A.

Formed about opposite sides of the extension 32B is an opening 32C. That is opening 32C is formed in both the opposed C-shaped flanges. Opening 32C is also designed to align with an opening formed in the upper portion of the leg 30. When the upper portion of the leg 30 is inserted into the extension 32B, it is anticipated that the upper terminal end of the leg will abut and support the lower side of member 22 or 24. When the upper terminal end of the leg 32 abuts against the lower side of member 22 or 24, the openings 32C formed in the extension 32B should align with the transverse opening formed in the upper portion of the leg 30.

To secure the leg connector 32 about member 22 or 24 and to the leg 30, there is provided a nut and bolt/screw assembly indicated generally by the numeral 40. Assembly 40 includes a screw or bolt 42 that is adapted to extend through the openings 32C and through the transverse opening formed in the upper portion of the leg 30. Further, there is provide a wing nut 44 that is adapted to be screwed onto the terminal end portion of the screw or bolt 42. The nut and bolt/screw assembly 40 can assume a relatively tight or a relatively loose state. When the assembly 40 assumes a relatively tight state, the U-shaped strap 32A is closed tightly around the confined member 22 or 24. This securely stations or anchors the leg connector 32 on the adjustable bed frame section 20. To adjust the position of the leg connector 32 and consequently to adjust the position of the leg 30 with respect to the bed frame section 20, the fastener 40 is placed in the relatively loose state such that the entire leg 30 and leg connector 32 can be moved and adjusted along the length of the members 22 and 24. Once a desired position has been located, the fastener 40 can be tightened so as to securely station the leg connector 32 and the underlying supporting leg 30.

Figure 2:
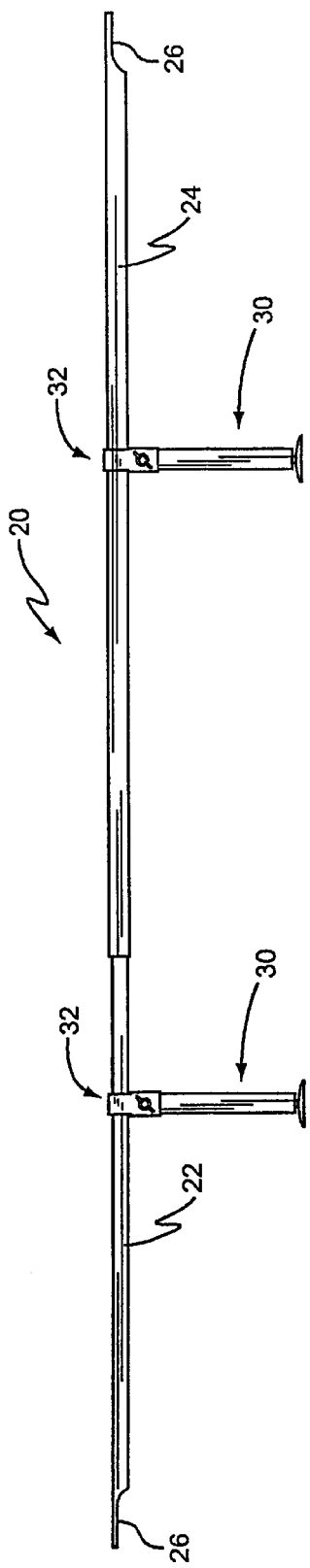
FIG. 2 is a side elevational view showing one embodiment of the adjustable bed frame section, with the bed frame section being disposed in an extended position.
Figure 3:
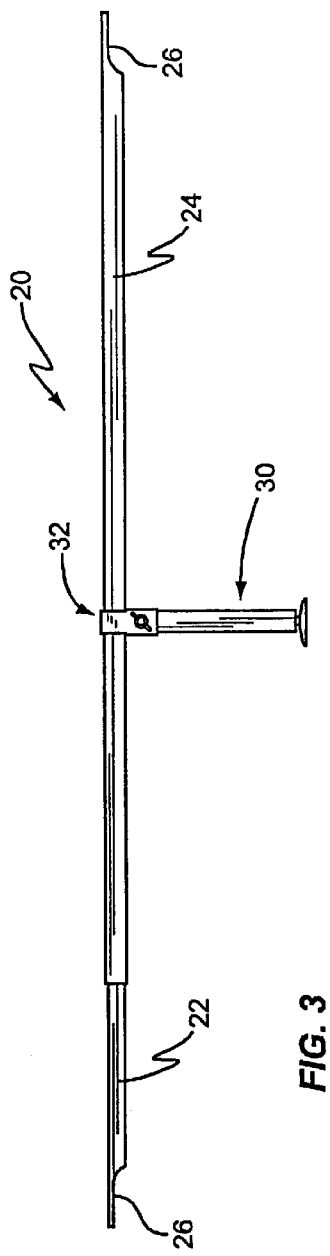
FIG. 3 is a side elevational view of the adjustable bed frame section with the bed frame section being disposed in an intermediate position.
Figure 4:
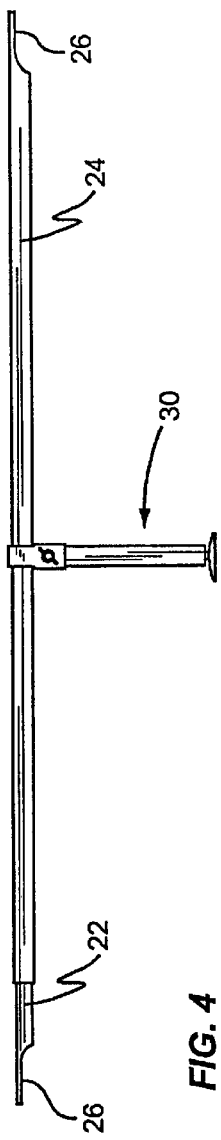
FIG. 4 is a side elevational view similar to FIG. 3 but with the adjustable bed frame section extending a length less than that show in FIGS. 2 and 3.

Each adjustable bed frame section 20 may include one or more leg connectors 32 and associated legs 30. In some embodiments, a single leg connector 32 and a single leg 30 will be sufficient. However, in some configurations, such as that illustrated in FIG. 2, more than one leg connector 32 and more than one leg 30 can be provided. For example, in the exemplary embodiment shown in FIG. 2, when the members 22 and 24 are extended to accommodate a King size bed, for example, it may be appropriate to provide a leg connector 32 and an associated leg 30 on each member 22 and 24. As noted above, each leg connector thereon, can be adjusted along the length of a respective member 22 or 24. In some cases, more than one leg connector 32 and more than one leg 30 may be positioned on a single member 22 or 24. In other exemplary embodiments, such as those illustrated in FIGS. 3 and 4, one single leg connector 32 along with a single leg 30 may be sufficient to support the overall load associated with the bed fame, box springs and mattress.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An adjustable bed frame section, comprising:
   a first member;
   a second member telescopically contained within a portion of the first member;
   a leg assembly adapted to be secured to the bed frame section, the leg assembly including:
   i. a leg;
   ii. a saddle connector extending over the first or second member;
   iii. the saddle connector including a top portion that extends over the top and along side portions of the first or second members and an extension that extends past the first or second member and adjacent the leg; and
   iv. a fastener for securing the extension of the saddle connector to the leg.

2. The bed frame section of claim 1 wherein the extension of the saddle connector includes a pair of opposed generally C-shaped flanges with each C-shape flange adapted to extend around a portion of the leg.

3. The bed frame section of claim 1 wherein the fastener includes a bolt and nut assembly and wherein the bolt extends through both the leg and the extension.

4. The bed frame section of claim 1 wherein the saddle connector includes a U-shaped section that extends at least partially around the first or second member and wherein the extension extends from the U-shaped section.

5. The bed frame section of claim 1 wherein the saddle connector may be moved along the length of the first or second member and secured in a plurality of different positions along the length of the first or second member.

6. The bed frame section of claim 5 wherein the fastener can assume a relatively tight or a relatively loose state and wherein when the fastener assumes the relatively loose state, the saddle connector may be moved along the length of the first or second member.

7. The bed frame section of claim 5 wherein when the fastener assumes the relatively tight state, the saddle connector is squeezed against the first or second member so as to generally secure the saddle connector to the first or second member.

8. A bed frame section, comprising: an elongated member; a leg; a leg connector adapted to be mounted to the elongated member; the leg connector including an upper section that extends over and at least partially around the elongated member and includes an extension that extends downwardly from the upper section; the extension including an opening for receiving an upper portion of the leg; and a fastener for securing the extension to the upper portion of the leg.

9. The bed frame section of claim 8 wherein the upper section of the leg connector is moveable along the elongated member, and wherein the leg connector and the leg can be secured at various positions along the length of the elongated member.

10. The bed frame section of claim 8 wherein the upper section includes a generally inverted U-shaped section that extends around a plurality of sides that form a part of the elongated member, and wherein the extension includes a pair of opposed generally C-shaped retainers that engage opposite sides of the leg.

11. The bed frame section of claim 10 wherein the leg is of a generally polygonal cross-section and wherein each C-shaped retainer engages at least three sides of the leg.

12. The bed frame section of claim 8 wherein the fastener includes a bolt and nut assembly and wherein there is provided an opening in both the leg and the extension of the leg connector such that the bolt assembly can be extended through the openings in both the leg and the extension.

13. The bed frame section of claim 8 wherein the fastener is operative to assume a relatively tight and a relatively loose state and wherein in the relatively loose state the leg connector may be adjustably moved along the length of the elongated member and wherein in the relatively tight state the leg connector is secured in one position on the elongated member.

14. A method of adjusting the length of a bed frame section and the position of a supporting leg wherein the bed frame section includes a pair of telescoping members and a leg connector connecting the leg to one of the members, comprising:

extending the telescoping members a selected length;

moving the leg connector along the length of one of the members; and stationing the leg connector on one of the members at a particular position by extending a fastener through a portion of the leg and through an extension that extends from the leg connecter and tightening the fastener so as to secure the leg connector around a portion of one of the members.

15. The method of claim 14 wherein tightening the fastener causes the leg connector to be moved against one of the members.

16. The method of claim 14 wherein moving the leg connector along the length of one of the members includes sliding a generally U-shaped section that at least partially surrounds one of the members along the length of the member; and wherein the method further includes inserting an upper end portion of the leg into the extension extending downwardly from the U-shaped section and securing the fastener wherein the fastener comprises a bolt and nut assembly.

17. The method of claim 14 including placing at least two leg connectors on the bed frame section, one leg connector on one member and the other leg connector on the other member; connecting a leg to each leg connector; and moving each leg connector along a respective member and securing each leg connector on a respective member such that there is a spaced apart relationship between the two legs.

18. The method of claim 14 wherein the leg connector includes a generally inverted U-shaped strap that extends around a portion of one of the members and wherein the extension extends downwardly from the U-shaped strap and includes an opening for receiving a portion of the leg; and wherein the fastener includes a bolt assembly extending through both the leg and the extension.

19. The method of claim 18 wherein the leg includes a generally polygonal shaped cross-section and wherein the extension of the leg connector includes a pair of opposed generally C-shaped flanges wherein each C-shape flange contacts the leg on at least three sides.

20. The method of claim 14 including tightening the fastener and closing the leg connector onto one of the members so as to secure the leg connector to the one member.

\* \* \* \* \*